Patented Sept. 5, 1944

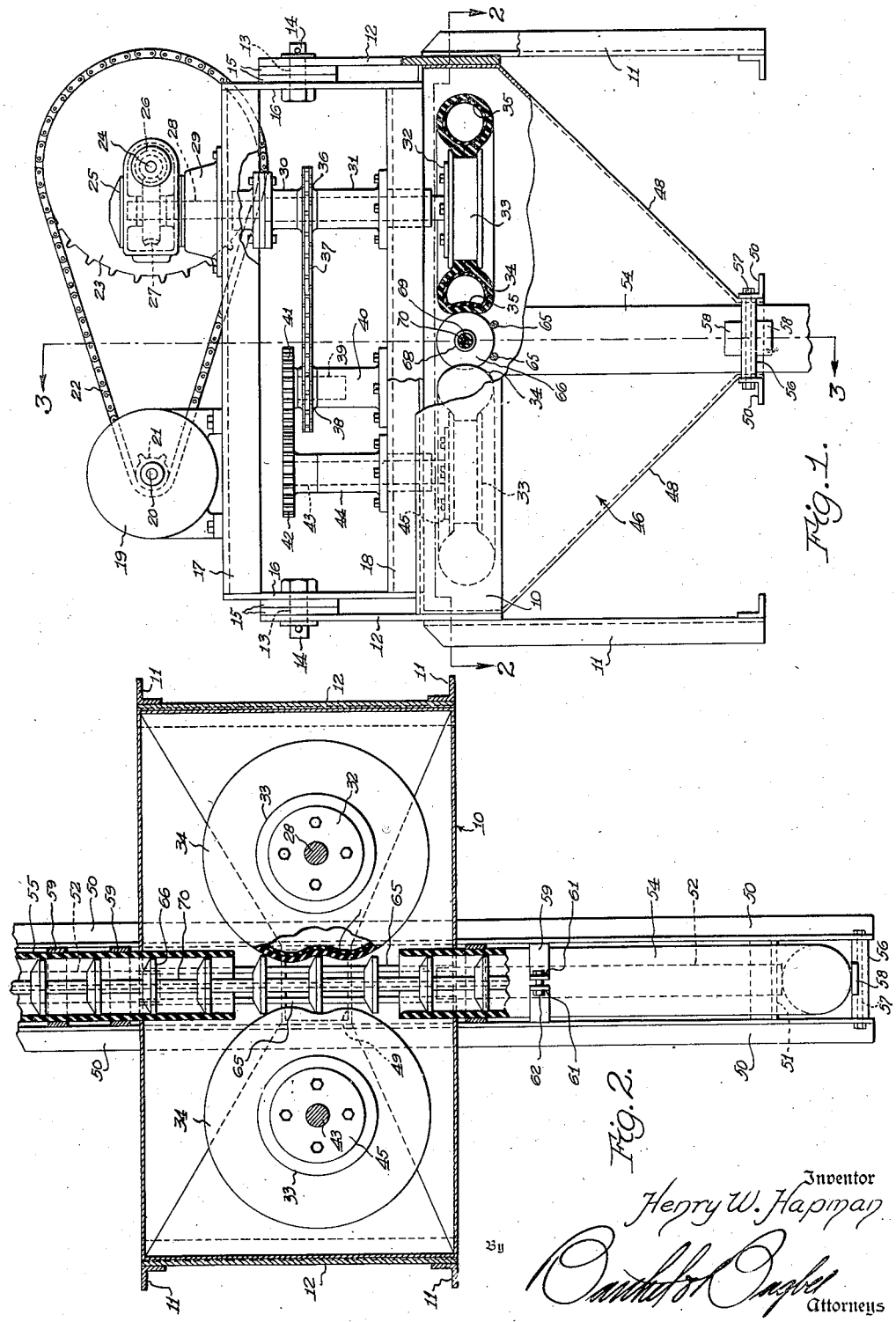

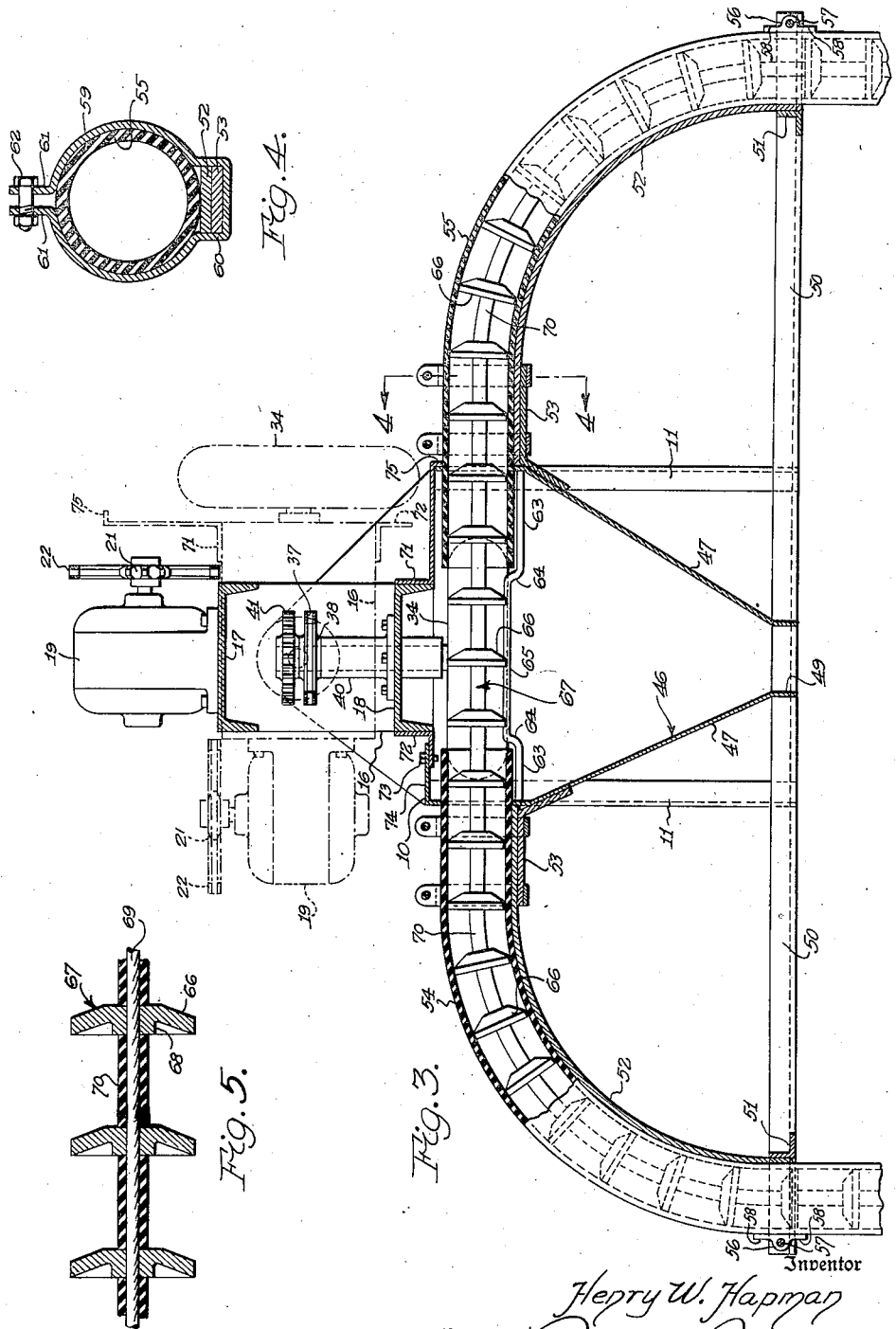

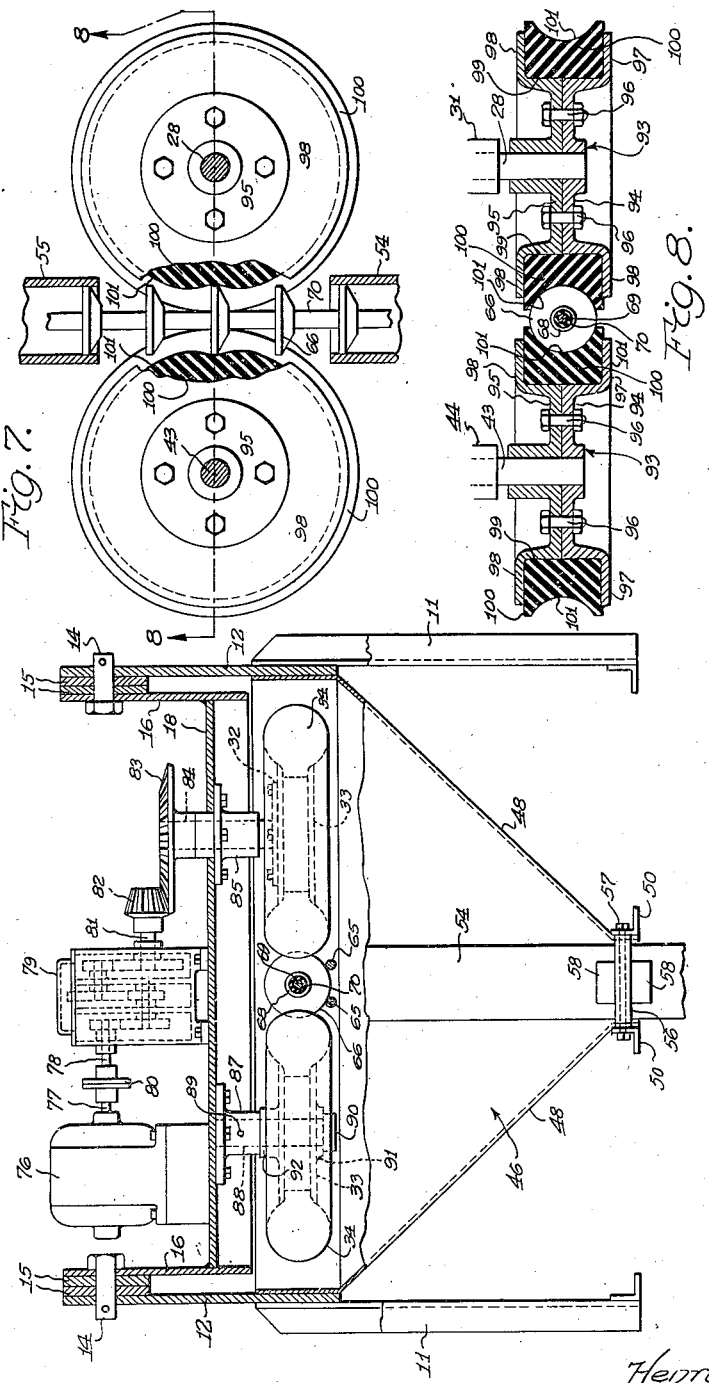

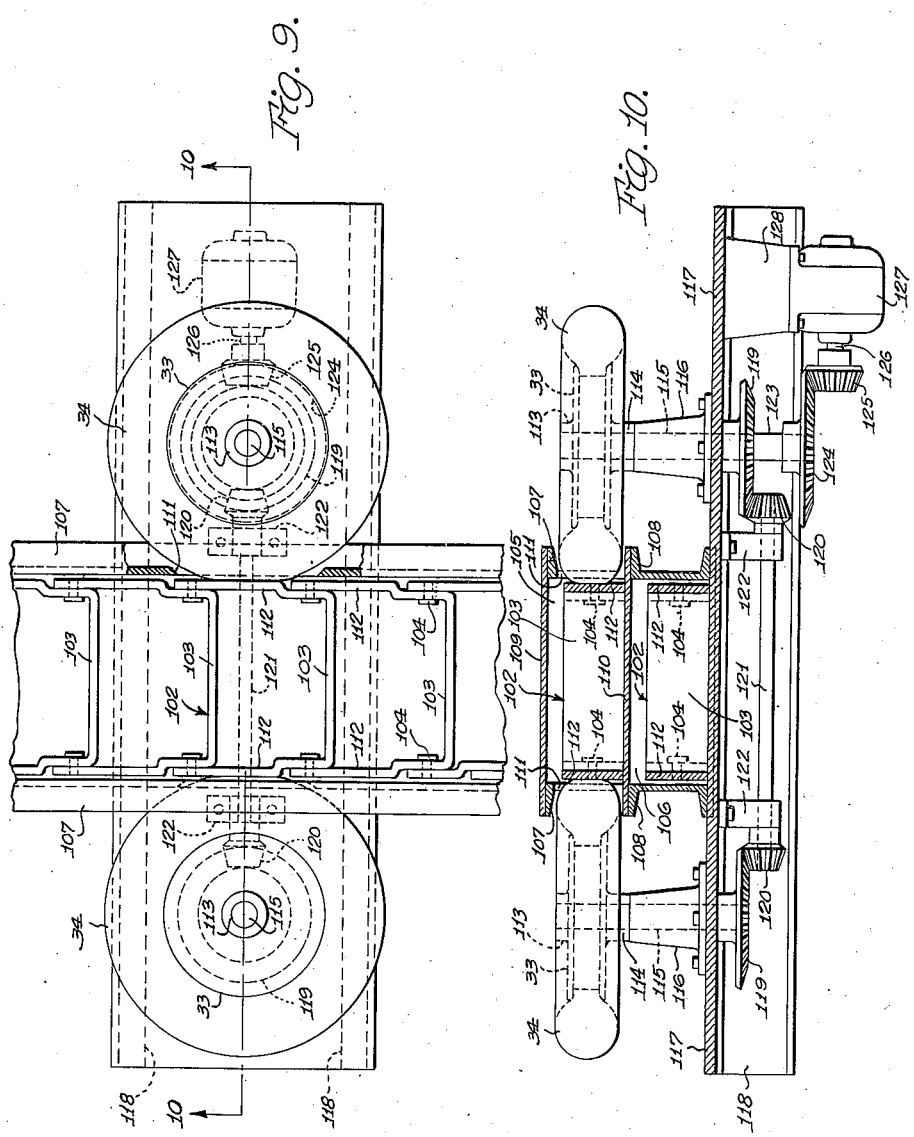

2,357,651

UNITED STATES PATENT OFFICE 2,357,651

CONVEYER PROPELLING DEVICE

Henry W. Hapman, Detroit, Mich.

Application June 27, 1941, Serial No. 399,973

7 Claims. (Cl. 198—203)

This invention relates to propelling devices and in particular to propelling mechanisms for conveyers.

One object of this invention is to provide a conveyer propelling mechanism for resiliently and flexibly propelling the flights of a flight conveyer.

Another object is to provide a propelling mechanism for flight conveyers wherein the flights are engaged by rotary resilient members, so that the flights may be irregularly spaced or of varying positions.

Another object is to provide a propelling mechanism for flight conveyers including one or more rotary members having resilient peripheral portions engaging the edges of the conveyer flights, these resilient peripheral portions being preferably of rubber-like material, either hollow and inflated or solid.

Another object is to provide a propelling mechanism for flight conveyers wherein the conveyer flights are engaged by rotary members in the form of pneumatic tires mounted upon rims, one or more of which are power-driven.

Another object is to provide a conveyer propelling mechanism having a pair of pulley-like members with peripheral grooves containing resilient liners with concave, annular grooves adapted to engage the edges of the conveyer flights, and means for driving one or more of the pulley-like members.

Another object is to provide a propelling mechanism for flight conveyers consisting of a movable base carrying a pair of rotary members with resilient peripheral portions adapted to engage the opposite sides of the conveyer flights, the base also carrying a motor for driving at least one of the rotary members, the entire assembly being movable out of engagement with the conveyer flights by moving the base upon which the other parts are mounted, thereby giving access to the conveyer flights as well as enabling repairs to be made on the rotary propelling members or other parts of the mechanism.

Another object is to provide a flight conveyer having elongated flights moving in a conduit of elongated cross-section and engaged on opposite sides by resilient rotary propelling members, one or more of which is driven by a motor or other suitable source of power.

Another object is to provide a flight conveyer consisting of flights disposed at intervals along a flexible connector arranged within a conduit having its ends spaced apart and interconnected by a casing containing rotary propelling members engaging the opposite sides of the conveyer flights.

In the drawings:

Figure 1 is an end elevation, partly in section, of the preferred embodiment of the conveyer propelling device of the invention, wherein both rotary propelling members are power-driven.

Figure 2 is a horizontal section taken along the line 2—2 in Figure 1.

Figure 3 is a vertical section longitudinally through the conveyer taken along the line 3—3 in Figure 1.

Figure 4 is a cross section through the conveyer showing one of the conduit connections, taken along the line 4—4 in Figure 3, with the conveyer flights removed.

Figure 5 is a central longitudinal section through the conveyer flights and connector removed from Figure 4.

Figure 6 is an end elevation, partly in section, of a modification wherein only one of the rotary propelling members is power-driven.

Figure 7 is a top plan view, partly in section, of a modification wherein the rotary propelling members have concavely grooved annular resilient portions for engagement with the conveyer flights.

Figure 8 is a central vertical section taken along the line 8—8 in Figure 7.

Figure 9 is a top plan view of a further modification wherein the conveyer is provided with flights of elongated cross-section driven by rotary propelling members on opposite sides thereof.

Figure 10 is a vertical section taken along the line 10—10 in Figure 9.

General arrangement

In general, the invention consists of a base or support carrying a pair of shafts upon which a pair of rims are rotatably mounted. These rims carry annular resilient members, such as pneumatic tires, and are spaced apart a sufficient distance to permit the passage of a flight conveyer between their peripheries. The peripheries are spaced apart slightly less than the diameter of the conveyer flights in order for the peripheries to yield slightly and thereby provide a driving engagement with the conveyer flights. Both rims may be power-driven by a motor mounted upon the base, as in heavy duty conveying, or optionally, only one of the rims may be driven, in the event of light duty conveying. The base is preferably mounted upon trunnions or is otherwise movable to permit repairs upon the parts and to facilitate cleaning of the conveyer mechanism. The conduits through which the flight conveyer moves are separated at the driving location, their ends being interconnected by a coupling arrangement (Figures 3 and 4).

A modification (Figures 7 and 8) provides the rims with annular grooves containing concavely grooved annular driving members, preferably of resilient or rubber-like material, these engaging the opposite edges of the conveyer flights. The driving mechanism for these rims may be similar to that in the other forms of the invention, where one of the rims is directly driven and the other is idle or drivingly coupled with the direct drive.

A further modification (Figures 9 and 10) provides conveyer flights of elongated cross section and engaged on opposite sides by resilient rotary propelling members as disclosed in the other forms of the invention. Either one or both of these rotary propelling members may be power driven. The invention provides an inexpensive yet efficient means for propelling flight conveyers and may utilize standard forms of pneumatic vehicle tires in order to further reduce the cost. The engagement with the conveyer is of a resilient nature so that shocks are absorbed and noise is greatly reduced. The harsh sprockets and conveyer chains previously used are eliminated and with them the necessity for equally spacing the conveyer flights. With the present invention, the conveyer flights may be spaced at odd intervals without seriously affecting the operation thereof, so long as two successive flights may be engaged by the rotary propelling members at one time.

The use of rubber-like resilient propelling members is of great value in conveying abrasive materials, which tend to chip metallic conveyers and which grind away the sprocket teeth and sprocket chains thereof and involve serious wear upon the bearings. Chemical materials may be conveyed, especially when the pneumatic or resilient propelling members are made of synthetic rubber or the like.

*Pneumatic double-driven propelling device*

Referring to the drawings in detail, Figures 1 to 5 inclusive show a preferred embodiment of the invention as consisting of a supporting frame 10 mounted on pillars 11 and having uprights 12 with apertures 13 through which pass trunnion pins 14. The trunnion pins 14 likewise pass through washers or spacers 15 and through the side members 16 interconnecting upper and lower channel members 17 and 18.

Mounted on the upper channel member 17 is an electric motor 19 having a motor shaft 20 provided with a sprocket 21 drivingly engaging a sprocket chain 22. The latter meshes with a sprocket 23 mounted upon the input shaft 24 of a reduction gear set 25 containing a worm 26 mounted on the shaft 24 and meshing with a worm gear 27 mounted upon the conveyer drive shaft 28.

The conveyer drive shaft 28 passes downwardly through the base 29 of the reduction gear set 25 through the channel member 17 and through the upper and lower tubular journal members 30 and 31 (Figure 1) which are secured respectively to the upper and lower channel members 17 and 18.

Mounted on the lower end of the shaft 28 is a disk 32 to which is secured an annular rim 33 carrying a pneumatic tire casing 34 with an inflatable pneumatic inner tube 35 therein. The tire casing 34 may be of a standard type such as is used for the wheels of motor vehicles.

Mounted on an intermediate portion of the shaft 28 between the upper and lower journal members 30 and 31 is a sprocket 36 drivingly engaging a sprocket chain 37 meshing with a sprocket 38 mounted upon the stub shaft 39 carried by the journal member 40 mounted upon the lower channel member 18. The upper end of the stub shaft 39 carries a gear 41 which meshes with a gear 42 mounted upon a shaft 43 rotatably supported in a vertical journal member 44 mounted upon the lower channel member 18. The lower end of the shaft 43 carries a disk 45 similar to the disk 32, to which is secured a similar annular rim 33, tire casing 34, and inner tube 35.

The support 10 is in the form of a casing or box having a hopper 46 (Figure 3) with end walls 47 and side walls 48 (Figure 1) extending downwardly therefrom to the discharge spout 49 thereon. The latter is connected to longitudinal channel members 50 connected at their opposite ends to cross members 51 to which are connected the lower ends of arcuate supports 52 (Figure 3), the upper ends of which are supported by angle brackets 53 secured to the hopper end walls 47. The arcuate supports 52 serve to sustain the conveyer conduit portions 54 and 55, the lower portions of which are held in position against the cross members 51 by the outer cross members 56 bolted as at 57 between the longitudinal channel members 50. The outer cross members 56 are provided with contact portions 58 for engagement with the conduit portions 54 and 55.

The upper ends of the conduit portions 54 and 55 are encircled by hoop-like bands 59 having downwardly-extending lower portions 60 passing beneath the angle brackets 53 and the arcuate supports 52 (Figure 4) and having upwardly-extending parallel portions 61 interconnected by a clamping bolt 62. In this manner the ends of the conduit portions 54 and 55 are firmly held in proper alignment. Extending between the opposite sides of the hopper 46 and mounted between the angle brackets 53 are supporting rods 63 (Figure 3) having upwardly bent portions 64 terminating in level portions 65 which serve to support the flights 66 of a flight conveyer generally designated 67 (Figures 3 and 5). The conveyer flights 66 may be in the form of disks having hubs 68 mounted upon a flexible connector 69 such as a stranded steel cable. The conveyer flights 67 are spaced apart from one another along the flexible connector 69 by tubular spacers 70, preferably of rubber or of rubber-like material such as synthetic rubber. Likewise, the walls of the conduit portions 54 and 55 are preferably of rubber or rubber-like material such as synthetic material. For heavy duty work, the conveyer conduits 54 and 55 are preferably wire-wound or having wire or rods incorporated in their walls to impart additional strength while retaining flexibility.

The trunnion pins 14 enable the propelling unit to be swung to one side as indicated by the dotted lines in Figure 3. In order to anchor this assembly, the lower channel member 18 is provided with angle members 71 and 72 secured thereto along the lateral flanges thereof. The angle members 71 and 72 serve as cover members for enclosing the top part of the conveyer casing formed by the box-like supporting frame 10. A bolt 73 passing through the upper portion 74 of the supporting frame 10 and through the angle member 72 serves to lock the propelling mechanism against swinging on its trunnion pins 14. When the swinging is to be accomplished, the bolt 73 is temporarily removed, whereupon the device may be moved into the position shown in the dotted lines in Figure 3. The bent portion 71 is provided with a downwardly flanged edge 75 to prevent the escape of dust from the materials being conveyed.

Operation of double-driven pneumatic propelling device

In the operation of the propelling device shown in Figures 1 to 5 inclusive, the starting of the motor 19 causes the shafts 28 and 43 to be rotated in opposite directions (Figures 1 and 2), thereby causing the pneumatic tires 34 to be rotated in opposite directions. The engagement of the tires 34 with the conveyer flights 66 causes the latter to be propelled along the supporting rods 65, the propelled flights transmitting the propelling force to the other flights through the spacers 70 and flexible connector 69. As the conveyer flights 66 pass along the supporting rod 65, they discharge the conveyed materials into the hopper 46 and thence downwardly through the discharge spout 49 into any suitable receiver. The tires 34 may be inflated to the desired amount, and yield as they grip the flights 66 (Figures 1 and 2) so that a similar propelling movement is imparted to the flight conveyer 67. The flights 66 of the latter need not be evenly spaced, as the tires 34 will accommodate themselves equally well to unevenly spaced flights, unlike the ordinary conveyers propelled by sprocket chains and sprockets.

In the event it is desired to clean the hopper 46 or make repairs or inflate the tires, the bolt 73 is removed (Figure 3), whereupon the device may be swung around the trunnion pins 14 into the dotted line position of Figure 3. Worn tires may also be replaced or the parts generally overhauled, as desired.

Pneumatic single-driven propelling device

The modification shown in Figure 6 is generally similar to the form shown in Figures 1 to 5, inclusive and similar parts bear corresponding reference numerals. Here the motor 76 is directly mounted on the lower channel member 18, the upper channel member 17 being omitted. The motor shaft 77 of the motor 76 drives the in-put shaft 78 of a reduction gear box 79 through a coupling 80, the out-put shaft 81 carrying a bevel pinion 82 which drives a bevel gear 83 mounted on the vertical shaft 84 rotatably supported in the journal 85 secured to the lower channel member 18. Mounted on the shaft 84 is a disk, rim and pneumatic tire assembly similar to the disk 32, rim 33, and tire casing 34 shown in Figure 1.

Also mounted on the lower channel member 18 is a tubular shaft bracket 87 carrying a vertical shaft 88 secured thereto as at 89 and having a head 90 for retaining thereon a tire and rim assembly similar to the tire 34 and rim 33 of Figure 1. Hubs 91 and 92 are provided for properly locating the tire 34 and rim 33 upon the shaft 88.

The operation of the form shown in Figure 6 is similar to that of Figure 1 except that only the shaft 84 is positively driven from the motor 76. The left hand tire 34 is freely rotatable and is not positively driven. The device shown in Figure 6 may be swung upwardly around the trunnion pins 14 into a position similar to that shown in Figure 3 for repairs or cleaning. The operation of the flight conveyer is otherwise similar to that already described in connection with Figures 1 to 5 inclusive.

Propelling device with concave resilient peripheries

The modification shown in Figures 7 and 8 is generally similar as regards most of its parts with the form shown in Figures 1 to 5 inclusive. The shafts 28 and 43 are similarly supported in journals 31 and 44, but are provided with pulley-like members 93 consisting of pulley halves 94 and 95 bolted together as at 96. The pulley halves 94 and 95 are upwardly flanged as at 97 and 98 respectively, thereby providing a peripheral annular groove 99 serving to receive an annular resilient member 100 of rubber-like material, such as natural or synthetic rubber. This is provided with a concave annular groove 101 which serves to embrace and drivingly grip the conveyer flights 66 disposed therebetween. As shown in Figure 7, the conveyer flights 66 are of slightly larger diameter than the distance between the bottoms of the grooves 101, so that the material is slightly depressed as the conveyer flights 66 pass between and are driven by the resilient members 100. The operation of the modification shown in Figures 7 and 8 is similar to that of the previously described forms of the invention, and either one or both of the shafts 28 and 43 may be power driven.

Pneumatic drive for elongated flight conveyer

The modification shown in Figures 9 and 10 employs a flight conveyer generally designated 102 with flights 103 of elongated cross-section pivotally interconnected at the pivot pins 104 and travelling in conduits 105 and 106 formed between the side channel members 107 and 108 and the horizontal plate members 109 and 110 (Figure 10). The side channel members 107 are provided with apertures 111 through which the tires 34 project and engage the side portions 112 of the conveyer flights 103. The tires 34 are mounted upon rims 33 as in previously described forms of the invention, and these in turn are provided with hubs 113 and 114 by which they are connected to a vertical shaft 115 rotatably supported in a tubular vertical bracket 116 mounted on the web 117 of the channel member 118. The lower end of the shaft 115 carries a bevel gear 119 which meshes with a bevel pinion 120 mounted upon a cross shaft 121 rotatably supported in brackets 122 secured to the underside of the channel web 117. The right-hand shaft 115 (Figure 10) is provided with an extended portion 123 at its lower end, this extended portion carrying a bevel gear 124 which meshes with a bevel pinion 125 mounted upon the motor shaft 126 of a motor 127 secured to the base 128 depending from the lower side of the channel member 117.

The operation of the modification shown in Figures 9 and 10 is generally similar in principle to that described with respect to the other forms of the invention shown in the preceding figures. The motor 127, through the intermediate shafts and gearing, drives the shafts 115 in opposite directions, rotating the tires 34 and causing them to frictionally engage and move the conveyer flights 103. As the tires 34 in Figures 10 are in view, it is unnecessary to pivot the device on trunnions in order to perform repairs or replacements.

While specific embodiments of the invention have been described and illustrated, it will be understood that various other modifications may be made within the scope of the appended claims without departing from the spirit of the invention.

What I claim is:

1. In a conveyer, a flexible connector carrying a multiplicity of closely spaced flights, a pair of spaced shafts on opposite sides of said connector with their axes in parallel relationship, a tire-carrying device on each shaft, a pneumatic tire on each tire-carrying device having its periphery engaging the opposite edge portions of said flights, and means for rotating said tire-carrying devices whereby to rotate said tires and drive said flights.

2. In a conveyer, a flexible connector carrying a multiplicity of spaced flights, a pair of spaced shafts on opposite sides of said connector, a tire-carrying device on each shaft, a pneumatic tire on each tire-carrying device having its periphery engaging said flights, and means for rotating both of said tire-carrying devices whereby to rotate said tires and drive said flights.

3. A driving device for a flight conveyer having a series of closely spaced flights thereon comprising a frame, a support movably mounted in said frame, a pair of shafts mounted on said support on opposite sides of said conveyer, a pair of rims mounted on said shafts with their radial walls in substantially the same plane, a pair of pneumatic tires mounted on said rims with the peripheral portions of their treads in engagement with the opposed edges of the flights of said flight conveyer, and means for driving said shafts.

4. A driving device for a flight conveyor having a series of closely spaced flights mounted thereon comprising a frame, a support movably mounted in said frame, a pair of shafts mounted on said support and disposed on opposite sides of said conveyer, a pair of rims mounted on said shafts with their radial walls in substantially the same plane, a pair of pneumatic tires mounted on said rims with their treads in engagement with the opposite edges of the flights of said flight conveyor, and means for driving said shafts, the movable mounting of said support relatively to said frame including trunnions pivotally interconnecting said frame and said support whereby said frame may be rocked on said trunnions to swing the pneumatic tires out of engagement with the conveyer flights.

5. A driving device for a flight conveyer having a series of closely spaced flights comprising a frame, a support movably mounted in said frame, a pair of shafts mounted on said support extending on opposite sides of said conveyer, a pair of rims mounted on said shafts in spaced parallel alinement, a pair of pneumatic tires mounted on said rims with their treads in engagement with the edges of the flights of said flight conveyer, a motor mounted on said support, and means for drivingly connecting said motor to said shafts.

6. A driving device for a flight conveyer having a series of closely spaced conveyer flights comprising a frame, a support movably mounted in said frame, a pair of shafts mounted on said support and disposed on opposite sides of the conveyer, a pair of rims mounted on said shafts arranged with their radial walls in the same plane, a pair of pneumatic tires mounted on said rims with the peripheral portions of their treads in engagement with the opposite edges of the flights of said flight conveyor, a motor mounted on said support, and means for drivingly connecting said motor to both of said shafts.

7. In a flight conveyer, a driving device therefor comprising a base, a pair of upwardly-extending shafts journaled in said base projecting on opposite sides of said conveyor, a pair of rims mounted on said shafts above said base with their peripheral portions opposed and their radial walls in substantially the same plane, a pair of pneumatic tires mounted on said rims with the opposed portions engaging the edges of said flights, and means for driving said shafts.

HENRY W. HAPMAN.